(No Model.)
T. P. MURPHY.
CAR WHEEL.
No. 554,526. Patented Feb. 11, 1896.
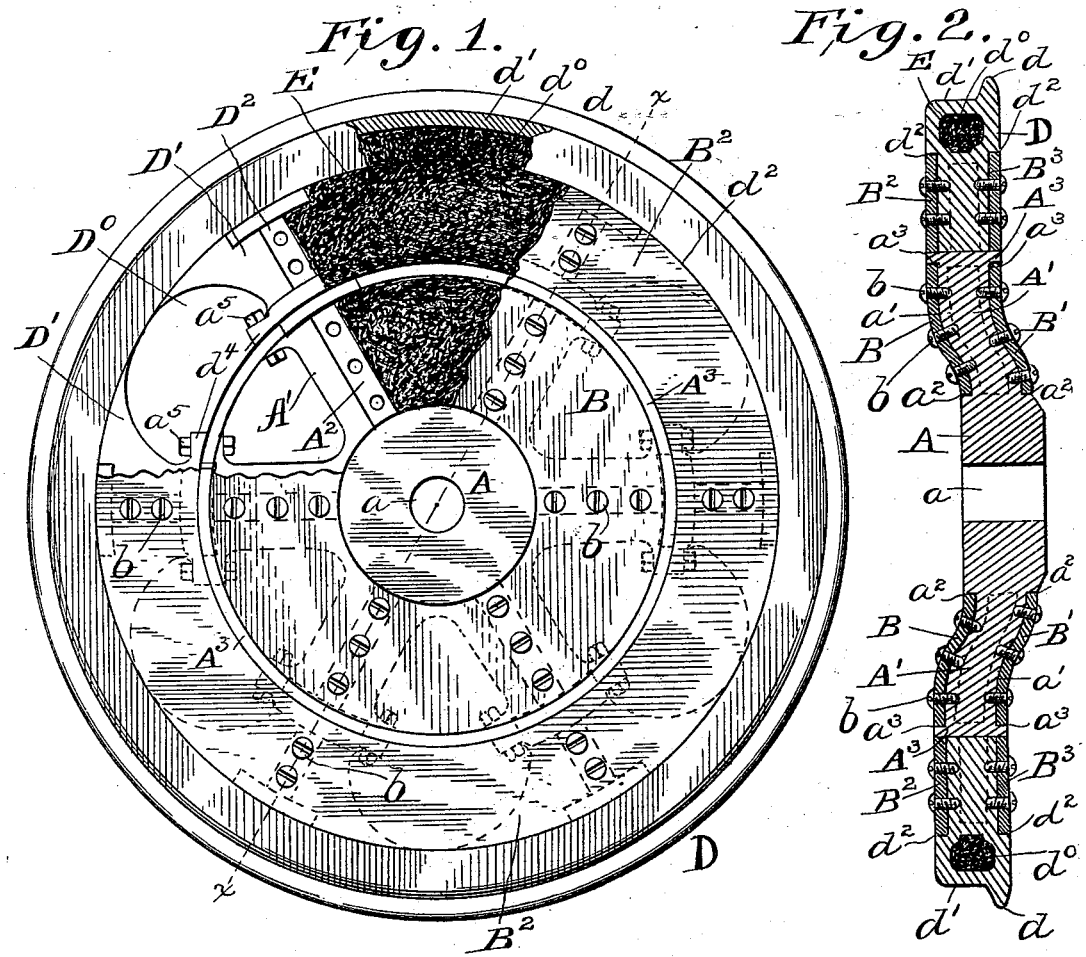
Witnesses:
Jos. H. Blackwood
Albert B. Blackwood.
Inventor,
T. P. Murphy,
by Whitman & Wilkinson,
Attorneys.

UNITED STATES PATENT OFFICE.

THOMAS P. MURPHY, OF NEW ORLEANS, LOUISIANA.

CAR-WHEEL.

SPECIFICATION forming part of Letters Patent No. 554,526, dated February 11, 1896.

Application filed July 5, 1895. Serial No. 554,989. (No model.)

*To all whom it may concern:*

Be it known that I, THOMAS P. MURPHY, a citizen of the United States, residing at New Orleans, in the parish of Orleans and State of Louisiana, have invented certain new and useful Improvements in Car-Wheels; and I do hereby declare the following to be a full, clear, and exact description of the invention, such as will enable others skilled in the art to which it appertains to make and use the same.

My invention relates to improvements in car-wheels; and it consists in providing an essentially noiseless car-wheel which is constructed as will be hereinafter described and claimed.

Reference is had to the accompanying drawings, in which the same parts are indicated by the same letters in both views.

Figure 1 represents a side elevation of the improved wheel partly broken away, and Fig. 2 represents a section along the line $x\ x$ of Fig. 1.

A represents the hub of the wheel, which is perforated at $a$ for the axle, and is provided with spokes A′, having ribs or strips $A^2$ raised thereon. The said hub, spokes, ribs, and the rim $A^3$ are preferably cast in one. The spokes are preferably curved, as at $a'$, and provided with inner shoulders, $a^2$, where they join the hub, and with outer shoulders, $a^3$, where they join the rim of the inner wheel, between which shoulders the annular plates B and B′ fit snugly and are held in position by the tap-rivets $b$, which engage in the ribs $A^2$.

It will be seen that there are wedge-shaped chambers or pockets formed by the hub, the rim, the spokes and ribs, and the annular plates, such as are shown in Fig. 1, and into these pockets or chambers is poured melted asphalt, rubber, or like non-resonant material.

Bolted to the rim of the inner wheel by means of the bolt $a^5$ is an outer ring, D, having spokes D′, with ears $d^4$ for the insertion of the bolts $a^5$, which ribs are preferably cast integral with the rim of the wheel and are provided with ribs $D^2$, similar to the ribs $A^2$, already described. This outer ring is flanged at $d$ and has a hollow tire $d'$ provided with shoulders $d^2$, between which shoulders and the rim $A^3$ are snugly fitted the annular plates $B^2$ and $B^3$, which are bolted to the ribs $D^2$, as shown in Fig. 2. The webs of the spokes of this outer ring are curved to form arch-shaped chambers $D^0$, into which and into the hollow tire is poured melted asphalt, rubber, or like non-resonant material. By this structure great strength and lightness are secured, and the noise due to the vibrations in the wheel is, to a large degree, obviated.

It will be obvious that various modifications might be made which could be used without departing from the spirit of my invention.

Having thus described my invention, what I claim, and desire to secure by Letters Patent of the United States, is—

1. A car-wheel consisting essentially of two concentric portions, the one inclosing the other, each provided with a plurality of radial spokes, with annular plates inclosing said spokes, thereby forming chambers, and non-resonant material inclosed in the said chambers, substantially as described.

2. A car-wheel consisting essentially of an inner wheel provided with a hub, spokes, and a rim; an outer rim provided with spokes attached to said inner rim; annular plates secured over the spokes in the inner and outer rims; and non-resonant material inclosed in the chambers formed by said spokes and said annular plates, substantially as described.

3. A car-wheel consisting essentially of an inner wheel provided with a hub, spokes, and a rim, an outer ring provided with spokes attached to said rim and having a hollow tire exterior to said spokes, annular plates secured between the rim and the hub on the inner wheel, and annular plates secured between the rim of the inner wheel and the tire of the outer ring, and non-resonant material inclosed in said hollow tire, and in the chambers, formed by the said spokes, and the said annular plates, substantially as described.

4. A car-wheel consisting essentially of two concentric portions, the one inclosing the other, each provided with a plurality of radial spokes, with annular plates inclosing said spokes, thereby forming chambers; and non-resonant material inclosed in the said chambers; and a hollow tire filled with non-resonant material on the exterior of the outer portion, substantially as described.

5. A car-wheel consisting essentially of an inner wheel provided with a hub, spokes, and a rim, an outer ring provided with arch-shaped spokes attached to said rim and having a hollow tire exterior to said spokes, annular plates fitting snugly and secured between the rim and the hub on the inner wheel, and annular plates fitting snugly and secured between the rim of the inner wheel and the tire of the outer ring, and non-resonant material inclosed in said hollow tire, and in the chambers, formed by the said spokes, and the said annular plates, substantially as described.

In testimony whereof I affix my signature in presence of two witnesses.

THOMAS P. MURPHY.

Witnesses:
WM. R. KER,
WM. H. HOWCOTT.